United States Patent
Nagano

(10) Patent No.: US 8,888,266 B2
(45) Date of Patent: *Nov. 18, 2014

(54) INK FOR INK-JET RECORDING, INK-JET RECORDING METHOD, AND INK-JET RECORDING APPARATUS

(75) Inventor: Taro Nagano, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 344 days.

This patent is subject to a terminal disclaimer.

(21) Appl. No.: 13/429,739

(22) Filed: Mar. 26, 2012

(65) Prior Publication Data

US 2012/0268517 A1   Oct. 25, 2012

(30) Foreign Application Priority Data

Apr. 22, 2011  (JP) ................. 2011-096204

(51) Int. Cl.
*C09D 11/00* (2014.01)
*C09D 11/38* (2014.01)
*C09D 11/322* (2014.01)

(52) U.S. Cl.
CPC .............. *C09D 11/38* (2013.01); *C09D 11/322* (2013.01)
USPC ......................................................... 347/100

(58) Field of Classification Search
USPC ......................................................... 347/100
See application file for complete search history.

(56) References Cited

U.S. PATENT DOCUMENTS

| 2007/0100023 | A1 | 5/2007 | Burns et al. |
| 2007/0100024 | A1 | 5/2007 | Gu et al. |
| 2007/0179213 | A1* | 8/2007 | Shakhnovich et al. ........ 523/160 |
| 2011/0207860 | A1* | 8/2011 | Shakhnovich et al. ......... 524/88 |
| 2012/0268520 | A1* | 10/2012 | Fukaya et al. ................. 347/21 |
| 2013/0083116 | A1* | 4/2013 | Fukaya et al. ................. 347/20 |

FOREIGN PATENT DOCUMENTS

| JP | 07-331146 | 12/1995 |
| JP | 2009-515007 | 4/2009 |

* cited by examiner

*Primary Examiner* — Laura Martin
(74) *Attorney, Agent, or Firm* — Banner & Witcoff, Ltd.

(57) ABSTRACT

There is provided an ink for ink-jet recording including: water; a water-soluble organic solvent; a water-soluble N-hydroxy cyclic imide compound; a self-dispersible pigment; and a surfactant of sulfuric acid ester salt type.

11 Claims, 1 Drawing Sheet

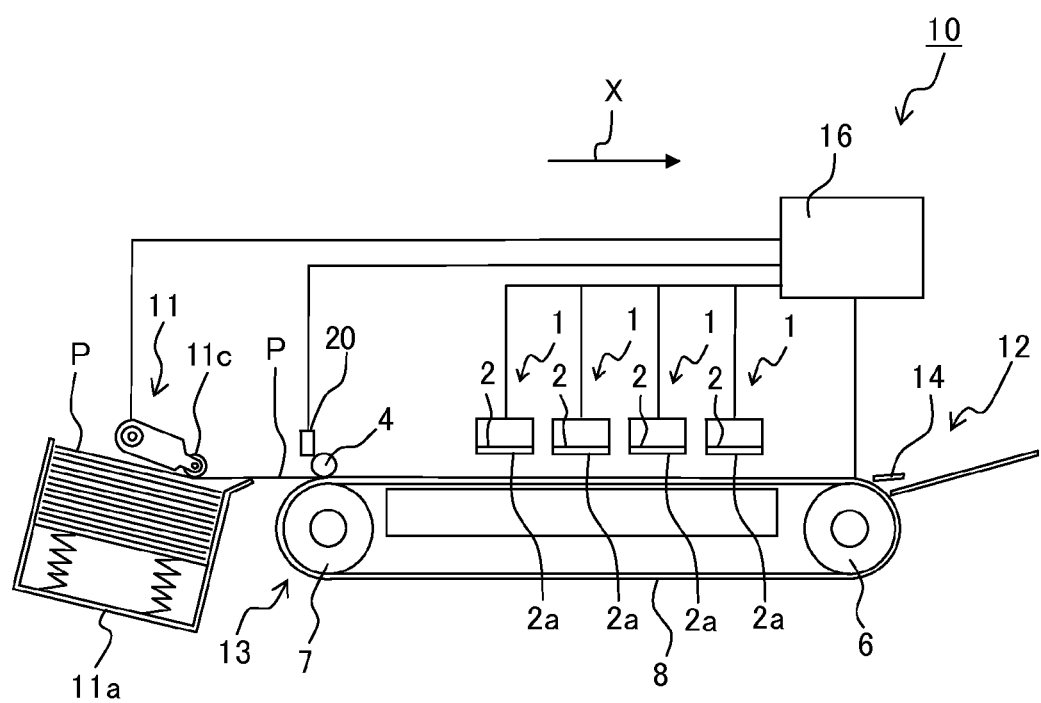

INK FOR INK-JET RECORDING, INK-JET RECORDING METHOD, AND INK-JET RECORDING APPARATUS

CROSS REFERENCE TO RELATED APPLICATION

The present application claims priority from Japanese Patent Application No. 2011-096204, filed on Apr. 22, 2011, the disclosure of which is incorporated herein by reference in its entirety.

BACKGROUND OF THE INVENTION

1. Field of the Invention

The present invention relates to an ink for ink-jet recording, an ink-jet recording method, and an ink-jet recording apparatus.

2. Description of the Related Art

An ink-jet recording method is a method in which printing is performed such that an ink is discharged in the form of droplets to be adhered on a recording medium such as a paper sheet. In such an ink-jet recording method, for example, the ink in which a pigment is dispersed in a water-soluble dispersant is used.

In recent years, however, from the viewpoints that an optical density (OD value) is high and that a printed matter having superior image quality can be obtained, investigation is made actively about the ink in which a self-dispersible pigment that requires no dispersant is used, instead of the ink in which the pigment is dispersed in the water-soluble dispersant. The OD value is required to be further improved.

As a method for improving the OD value, a method in which pigment concentration in the ink is made to be higher can be assumed. However, merely increasing the pigment concentration arises a problem such that the stability of the ink is decreased. In the present description, there is disclosed a technique that the optical density is improved while maintaining the stability of the ink in the ink-jet recording.

SUMMARY OF THE INVENTION

According to the first aspect of the present teaching, there is provided an ink for ink-jet recording including: water; a water-soluble organic solvent; a water-soluble N-hydroxy cyclic imide compound; a self-dispersible pigment; and a surfactant of sulfuric acid ester salt type.

According to the second aspect of the present teaching, there is provided an ink-jet recording method which performs recording on a recording medium including: preparing the ink for ink-jet recording as defined in the first aspect; and discharging the ink onto the recording medium.

According to the third aspect of the present teaching, there is provided an ink-jet recording apparatus which performs recording on a recording medium, including: an ink accommodating section in which the ink for ink-jet recording as defined in the first aspect is accommodated; and an ink discharge mechanism which discharges the ink onto the recording medium.

BRIEF DESCRIPTION OF THE DRAWINGS

FIG. 1 is a configuration diagram of an ink-jet recording apparatus described in an embodiment.

DESCRIPTION OF THE PREFERRED EMBODIMENTS

Hereinbelow, an explanation will be made about an ink (ink composition) for ink-jet recording, an ink-jet recording method, and an ink-jet recording apparatus of the present teaching.

[Ink for Ink-Jet Recording]

The ink for ink-jet recording (hereinbelow, referred to simply as "water based ink" or "ink") contains water, a water-soluble organic solvent, a water-soluble N-hydroxy cyclic imide compound, a self-dispersible pigment, and a surfactant of sulfuric acid ester salt type. The surfactant of sulfuric acid ester salt type includes one or more kinds of surfactants selected from a surfactant of alkyl sulfuric acid ester salt type and a surfactant of alkyl ether sulfuric acid ester salt type. An explanation will be made below in detail about the ink.

The water-soluble organic solvent includes, for example, a humectant which prevents the ink from drying at a tip portion of the ink-jet head and a penetrant which adjusts the drying speed of the ink on a recording medium. The water-soluble organic solvent includes those which are same as or equivalent to the water-soluble organic solvents generally used in the ink for ink-jet recording.

The humectant includes, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyvalent alcohols such as polyalkylene glycols, alkylene glycols, and glycerol; 2-pyrrolidone; N-methyl-2-pyrrolidone; and 1,3-dimethyl-2-imidazolidinone. The polyalkylene glycol includes, for example, polyethylene glycol and polypropylene glycol. The alkylene glycol includes, for example, ethylene glycol, propylene glycol, butylenes glycol, diethylene glycol, triethylene glycol, dipropylene glycol, tripropylene glycol, thiodiglycol, and hexylene glycol. It is allowable that only one type of the humectant as described above is used, or two or more types of the humectants are used. Among the above-described humectants, it is preferable to use polyvalent alcohols such as alkylene glycol and glycerol.

The blending ratio of the humectant with respect to the entire ink is, for example, 0% by mass to 95% by mass, is preferably 10% by mass to 80% by mass.

The penetrant includes, for example, glycol ether. The glycol ether includes, for example, ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. It is allowable that only one type of the penetrant as described above is used, or two or more types of the penetrants are used.

The blending ratio of the penetrant with respect to the entire ink is, for example, 0% by mass to 20% by mass. By making the blending ratio of the penetrant within the above-described range, the permeability of the ink into the paper sheet can be more suitable. The blending ratio of the penetrant is preferably 0.1% by mass to 15% by mass.

The self-dispersible pigment is dispersible in water without using any dispersing agent owing to the fact that at least one of the hydrophilic functional group and salt thereof including, for example, a carboxyl group, a phosphate group, and a sulfo group is introduced into surfaces of pigment particles by the chemical bond. As the self-dispersible pigment, it is allowable to use any publicly known self-dispersible pigment, which includes, for example, the self-dispersible pigment in which modification treatment is performed on the surfaces of the pigment particles in accordance with the method described in Published Japanese Translation of PCT International Publication for Patent Application No. 2009-515007.

In view of reaction between the self-dispersible pigment and the N-hydroxy cyclic imide compound, the self-dispersible pigment is preferably a self-dispersible pigment modified by the hydrophilic functional group selected from the carboxyl group, the phosphate group, and salts thereof.

The blending ratio of the self-dispersible pigment with respect to the entire ink is, for example, 0.1% by mass to 20% by mass, and is preferably 1% by mass to 10% by mass. By making the blending ratio of the self-dispersible pigment within 0.1% by mass to 20% by mass, superior storage stability of the ink can be obtained. It is allowable that only one type of the self-dispersible pigment is used, or two or more types of the self-dispersible pigments are used.

As the water-soluble N-hydroxy cyclic imide compound, the compound, which has water solubility and can react with the functional group modifying the self-dispersible pigment (as will be described later in detail), may be used. From the viewpoints that the solubility in water is satisfactory and that the reaction with the functional group modifying the self-dispersible pigment is quick, it is preferable to use, as the N-hydroxy cyclic imide compound described above, one or more kinds of compounds selected from N-hydroxysuccinimide and N-hydroxyphthalimide.

The blending ratio of the N-hydroxy cyclic imide compound with respect to the entire ink is determined by considering balance between the surfactant of sulfuric acid ester salt type and the N-hydroxy cyclic imide compound. For example, the blending ratio of the N-hydroxy cyclic imide compound with respect to the entire ink may be 0.01% by mass to 2% by mass, and may be more preferably 0.05% by mass to 1.0% by mass. By making the blending ratio of the N-hydroxy cyclic imide compound within the above-described range, the superior storage stability of the ink can be obtained. Further, the N-hydroxy cyclic imide compound in the ink improves an OD value of an image which is formed by using said ink. Thus, in a case that the OD value is important, the blending ratio of the N-hydroxy cyclic imide compound is preferably not less than 0.50% by mass.

The surfactant of sulfuric acid ester salt type is exemplified by the surfactant of alkyl sulfuric acid ester salt type and the surfactant of alkyl ether sulfuric acid ester salt type represented by the following formula (1).

$$R^1O-(R^2O)_n-SO_3M \quad (1)$$

In the formula (1), $R^1$ is an alkyl group, $R^2$ is an ethylene group or a propylene group, n is 0 to 10, M is an alkali metal, an alkali earth metal, ammonium, or alkanolamine. When R is 0, the surfactant represented by the formula (1) is the surfactant of alkyl sulfuric acid ester salt type. When R is not less than 1, the surfactant represented by the formula (1) is the surfactant of alkyl ether sulfuric acid ester salt type.

In the formula (1), $R^1$ is preferably the alkyl group having 8 to 18 carbon atoms (having a number of carbon atoms 8 to 18), $R^2$ is preferably the ethylene group, and n is preferably 1 to 10.

A specific example of M in the formula (1) includes, for example, sodium, potassium, calcium, magnesium, $NH_4$, $NH(C_2H_4OH)_3$, $NH_2(C_2H_4OH)_2$, and $NH_3-C_2H_4OH$. Out of these, M is preferably sodium, potassium, or ammonium.

Here, the surfactant of sulfuric acid ester salt type, in which n in the formula (1) is 0, is exemplified by the surfactant of alkyl sulfuric acid ester salt type etc. In particular, the surfactant of alkyl sulfuric acid ester salt type includes sodium hexadecyl sulfate, sodium stearyl sulfate, etc.

The surfactant of sulfuric acid ester salt type, in which n in the formula (1) is 1 or more, is exemplified by the surfactant of alkyl ether sulfuric acid ester salt type etc. In particular, the surfactant of alkyl ether sulfuric acid ester salt type includes sodium polyoxyethylene alkyl ether sulfate in which the carbon number of the alkyl group is in the range of 8 to 18 (n=2 or 3), sodium polyoxypropylene alkyl ether sulfate in which the carbon number of the alkyl group is in the range of 8 to 18 (n=1), etc. Any commercially available product may be used for the surfactant represented by the formula (1).

The ink includes one or more types of surfactants selected from the surfactant of alkyl sulfuric acid ester salt type and the surfactant of alkyl ether sulfuric acid ester salt type. The surfactant of sulfuric acid ester salt type, as described above, is preferably the surfactant of alkyl ether sulfuric acid ester salt type including the polyoxyethylene structure in which $R^2$ is the ethylene group and n is 1 or more in the formula (1).

The blending ratio of the surfactant of sulfuric acid ester salt type with respect to the entire ink is determined by considering balance between the surfactant of sulfuric acid ester salt type and the N-hydroxy cyclic imide compound. For example, the blending ratio of the surfactant of sulfuric acid ester salt type with respect to the entire ink may be 0.01% by mass to 2% by mass. By making the blending ratio of the surfactant of sulfuric acid ester salt type within the above-described range, the superior storage stability of the ink can be obtained.

Further, the mass ratio (X:Y) between the N-hydroxy cyclic imide compound (X) and the surfactant of sulfuric acid ester salt type (Y) is preferably 1:0.1 to 1:1. By making the mass ratio within the above-described range, it is possible to improve the optical density of the image without interfering with the storage stability of the ink.

The water-soluble N-hydroxy cyclic imide compound, the self-dispersible pigment, and one or more types of surfactants selected from the surfactant of alkyl sulfuric acid ester salt type and the surfactant of alkyl ether sulfuric acid ester salt type, those of which are included in the ink, have the effect that the optical density (OD value) of the image is improved while maintaining the stability of the ink. The mechanism of effect, in which the optical density of the image can be improved by using the ink of the present teaching while maintaining the stability of the ink, is unclear, but it can be assumed as follows.

In the ink of the present teaching, when the functional group modifying the surface of the self-dispersible pigment is brought in contact with the N-hydroxy cyclic imide compound, condensation reaction of the functional group (the carboxyl group) modifying the surface of the self-dispersible pigment and a hydroxy group attached to nitrogen of the N-hydroxy cyclic imide compound is caused, as shown in the following formula (2). The condensation reaction reduces repelling force generated in the pigment particles of the self-dispersible pigment, thereby facilitating aggregation of the pigment particles.

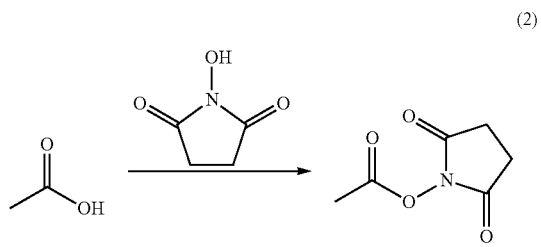

(2)

The ink of the present teaching includes the self-dispersible pigment and the water-soluble N-hydroxy cyclic imide compound. Thus, the condensation reaction represented in the formula (2) reduces the repelling force generated in the pigment particles of the self-dispersible pigment. However, the surfactant of sulfuric acid ester salt type included in the ink acts to increase the repelling force generated in the pigment particles which is reduced by the condensation reaction. As a result, a dispersion state of the self-dispersible pigment in the ink is maintained, and thereby maintaining the stability of the ink.

Here, when the ink of the present teaching is discharged onto the recording medium, the following effect can be achieved. That is, the reaction represented in the formula (2) progresses to reduce the repelling force generated in the pigment particles of the self-dispersible pigment. Thus, the aggregation of the pigment particles is facilitated thereby making it possible to improve the optical density (OD value). The reason thereof is considered as follows. That is, when the ink of the present teaching is discharged onto, for example, a paper sheet (an example of the recording medium), paper fiber on the recording medium functions as a filter so that the self-dispersible pigment exists in high concentration on the paper sheet, and/or the surfactant of sulfuric acid ester salt type is oriented toward and consumed by the surface of the paper fiber (new surface), thereby decreasing an amount of the surfactant of sulfuric acid ester salt type which contributes to the dispersion in the pigment particles.

On the other hand, when the ink of the present teaching is in a state of preservation, there is no filter as described above and the new surface is not increased. Thus, it is assumed that the dispersion state of the self-dispersible pigment in the ink is maintained. It is assumed that the mechanism as described above makes the optical density improve while maintaining the stability of the ink in the present teaching.

In the above formula (2), there is provided an example in which the functional group (modification group) modifying the surface of the self-dispersible pigment is the carboxyl group and the N-hydroxy cyclic imide compound is the N-hydroxysuccinimide. However, for example, the self-dispersible pigment may be a self-dispersible pigment including, for example, the phosphate group, the sulfo group, salt of the carboxyl group, salt of the phosphate group, or salt of the sulfo group. The N-hydroxy cyclic imide compound may be a N-hydroxy cyclic imide compound having reactivity with the modification group (for example, N-hydroxyphthalimide).

As described later in examples and comparative examples, it is not possible to maintain the stability of the ink when a surfactant other than the surfactant of sulfuric acid ester salt type is added to the ink including the self-dispersible pigment and the water-soluble N-hydroxy cyclic imide compound. The reason thereof is not clear, but it can be assumed as follows. That is, the surfactant of sulfuric acid ester salt type has some kind of specific effect on a combination of the N-hydroxy cyclic imide compound and the self-dispersible pigment, and thereby maintaining the dispersion state of the self-dispersible pigment. The inventor of the present teaching found out the combination of the self-dispersible pigment, the N-hydroxy cyclic imide compound, and the surfactant of sulfuric acid ester salt type to succeed in improving the optical density of the image while maintaining the stability of the ink.

The ink may further contain a conventionally known additive, if necessary. The additive includes, for example, surfactants other than the surfactant of sulfuric acid ester salt type described above, viscosity-adjusting agents, surface tension-adjusting agents, fungicides, and rust-preventing agents.

The ink can be prepared, for example, as follows. That is, the self-dispersible pigment, water, the water-soluble organic solvent, and optionally other additive component(s) as necessary are mixed uniformly or homogenously by a conventionally known method. Then, undissolved matter(s) is (are) removed by a filter or the like.

As described above, the ink of the present teaching is capable of improving the optical density of the image while maintaining the stability of the ink by containing the self-dispersible pigment, the N-hydroxy cyclic imide compound, and the surfactant of sulfuric acid ester salt type. Further, as a technique which improves the optical density of the image, it has been conventionally suggested that a treatment solution, which is applied to the recording medium together with the ink, is used. However, in the present teaching, the ink itself is capable of improving the optical density of the image without using the treatment solution.

[Ink-Jet Recording Method]

The ink-jet recording method of the present teaching is an ink-jet recording method which uses the ink described above, the ink-jet recording method including an ink adhering process in which the ink is discharged by the ink-jet system (in the ink jet manner) to be adhered on the recording medium. The adhesion of the ink onto the recording medium in the ink adhering process can be performed by a conventionally known method.

[Ink-Jet Recording Apparatus]

An ink-jet recording apparatus 10 of this embodiment is configured as follows. That is, the ink-jet recording apparatus 10 carries a line-type ink-jet head and applies the ink for ink-jet recording of the present teaching onto a recording surface of a recording paper sheet P (an example of the recording medium) by the ink-jet system.

As shown in FIG. 1, the ink-jet recording apparatus 10 is provided with four ink cartridges 1 (corresponding to ink accommodating sections), four ink-jet heads 2 (corresponding to ink discharge mechanisms), a paper feed section 11, a paper discharge section 12, a belt transport mechanism 13, and a controller 16 which is in charge of the control of the entire parts or components of ink-jet recording apparatus 10.

The four ink cartridges 1 are configured to accommodate the ink of the present teaching. The four color inks of yellow, magenta, cyan, and black are accommodated in the four ink cartridges 1, respectively.

The paper feed section 11 is disposed on one side of the belt transport mechanism 13 (left side in FIG. 1). The paper discharge section 12 is disposed on the other side of the belt transport mechanism 13 (right side in FIG. 1).

In the ink-jet recording apparatus 10, the recording paper sheet P is transported from the paper feed section 11 to the paper discharge section 12 via the belt transport mechanism 13 (in a direction shown by the arrow X of FIG. 1). The paper feed section 11 is provided with a recording paper stocker 11a and a pick-up roller 11c. The pick-up roller 11c is driven by a motor (not illustrated in the drawing) to pick up the recording paper sheets P stacked in the recording paper stocker 11a one by one from thereabove, and to feed the recording paper sheets P picked up one by one toward the downstream side from the upstream side in the transport direction of the recording paper sheet.

A recording paper detection sensor 20 is arranged immediately downstream of the paper feed section 11. The recoding paper detection sensor 20 detects whether or not the recording paper sheet P, which is fed from the paper feed section 11, arrives at a printing waiting position. The recoding paper detection sensor 20 is adjusted to detect the end portion in the downstream side of the recording paper sheet P located at the printing waiting position. The fed recording paper sheet P passes through the printing waiting position and is transported to the belt transport mechanism 13.

The transport belt 8 is an endless belt wound around two belt rollers 6 and 7 so that the transport belt 8 runs between the rollers 6 and 7. A platen 15 is arranged in an area surrounded by the transport belt 8 at a position at which the platen 15 is opposite to or faces the four ink-jet heads 2. The platen 15 supports the transport belt 8 so that the transport belt 8 does not sag or bend downwardly.

A nip roller 4 is arranged at a position facing the belt roller 7. When the recording paper sheet P, which is transported to the belt transport mechanism 13, is placed on the outer circumferential surface of the belt transport mechanism 13, the nip roller 4 presses the recording paper sheet P against the outer circumferential surface thereof.

When the transport motor rotates the belt roller 6, the transport belt 8 is driven (rotated) to thereby cause the transport belt 8 to transport the recording paper sheet P, which is pressed onto the outer circumference surface, toward the paper discharge section 12 in a state that the recording paper sheet P is pressingly held on the outer circumference surface. An exfoliating mechanism 14 is provided immediately downstream of the transport belt 8. The exfoliating mechanism 14 is constructed such that the recording paper sheet P, which is pressingly stuck to the outer circumferential surface of the transport belt, is exfoliated from the outer circumferential surface, and that the recording paper sheet P is fed to the paper discharge section 12.

The ink-jet recording using the ink-jet recording apparatus 10 is performed, for example, as follows. That is, when the recording paper sheet P transported by the transport belt 8 passes just below the four ink-jet heads 2, ink droplets of the respective colors (inks in the form of droplets) are discharged from four ink jetting surfaces 2a respectively. In this situation, the N-hydroxy cyclic imide compound contained in the ink is reacted, on the surface of the recording paper sheet P, with the modification group of the self-dispersible pigment contained in the ink. Thus, the aggregation of the pigment particles is facilitated thereby making it possible to obtain the image having the high optical density (high OD value).

As described above, in the present teaching, the ink itself is capable of improving the optical density of the image without using the treatment solution for ink-jet recording. For this reason, the ink-jet recording apparatus 10 as shown in FIG. 1 is an apparatus which does not include a treatment solution discharge mechanism. However, the ink of the present teaching may be used together with the treatment solution in order to, for example, further improve the optical density of the image. When the ink-jet recording is performed by using the treatment solution together with the ink of the present teaching, an ink-jet recording apparatus including a treatment solution accommodating section and the treatment solution discharge mechanism may be used. Further, the line-type ink-jet head is adopted in the ink-jet recording apparatus 10 as shown in FIG. 1. However, the present teaching is not limited thereto. A serial-type ink-jet head may be adopted in the ink-jet recording apparatus.

EXAMPLES

Hereinbelow, the present teaching will be specifically explained by Examples.
(1) Preparation of Inks and Evaluation about Absence or Presence of Aggregated Matter in Examples and Comparative Examples Components other than the self-dispersible pigment, of components described in TABLES 1 and 2, were mixed uniformly. Then, the self-dispersible pigment was added and mixed uniformly. As described above, each ink mixture was obtained. Here, each numerical value of each component described in TABLES 1 and 2 indicates the blending ratio provided that the entire ink mixture is 100% by mass. Each of the obtained ink mixtures was visually observed to confirm absence or presence of aggregated matter. The results thereof are shown in TABLES 1 and 2.

Details of the components described in TABLES 1 and 2 are as follows.
SUNNOL (trade name) NL 1430: sodium polyoxyethylene alkyl ether sulfate, produced by Lion Corporation, active-ingredient amount=27% by mass, the numerical value in each parenthesis in TABLES 1 and 2 indicates the active-ingredient amount.
EMAL (trade name) 20C: sodium polyoxyethylene lauryl ether sulfate (ethylene oxide 3 mol), produced by Kao Corporation, active-ingredient amount=25% by mass, the numerical value in the parenthesis in TABLE 1 indicates the active-ingredient amount. Mixture of sodium hexadecyl sulfate and sodium stearyl sulfate: Mixture of sodium hexadecyl sulfate (60%) and sodium stearyl sulfate (40%), produced by Kanto Kagaku Co., Ltd.
OLFIN (trade name) E1010: acetylene glycol-based surfactant (diol ethylene oxide (10 mol) adduct), produced by Nissin Chemical Industry Co., Ltd, active-ingredient amount=100% by mass
Sodium 1-dodecanesulfonate: produced by Kanto Kagaku Co., Ltd.
Sodium benzenesulfonate: produced by Kanto Kagaku Co., Ltd.
NEOPELEX (trade name) G-15: Sodium dodecylbenzenesulfonate, produced by Kao Corporation, active-ingredient amount=25% by mass, the numerical value in the parenthesis in TABLES 1 and 2 indicates the active-ingredient amount.
Sodium laurate: produced by Kanto Kagaku Co., Ltd.
N-hydroxysuccinimide: produced by Kanto Kagaku Co., Ltd.
N-hydroxyphthalimide: produced by Kanto Kagaku Co., Ltd.
Succinimide: produced by Kanto Kagaku Co., Ltd.
Phthalimide: produced by Kanto Kagaku Co., Ltd.
Self-dispersible pigment modified by carboxyl group: Cab-O-Jet (trade name) 300, produced by Cabot Specialty Chemicals, pigment concentration of 15% by mass, the numerical value in each parenthesis in TABLES 1 and 2 indicates pigment solid content.

Self-dispersible pigment modified by phosphate group:
    Water dispersion prepared to have the pigment concentration of 15% by mass by the method described in WO2007/053564.

In TABLES 1 and 2, the wording "aggregation" is used in each of the examples and comparative examples in which the aggregated matter was observed, and the wording "no aggregation" is used in each of the examples and comparative examples in which the aggregated matter was not observed. The preparation of ink is possible in each of the examples and comparative examples in which the aggregated matter was not observed, and the preparation of ink is impossible in each of the examples and comparative examples in which the aggregated matter was observed.

The ink mixture in which the aggregated matter was not observed was filtrated through a cellulose acetate membrane filter (pore size 3.00 μm) produced by Toyo Roshi Kaisha, Ltd., to obtain the ink.

(2) Evaluation
    (a) Storage Stability (Re-Dispersion Property) of Ink

The inks obtained in (1) were dripped each in an amount of 10 μL onto preparations, respectively. Subsequently, the preparations were stored for duration of one day under an environment of temperature: 60° C. and relative humidity: 40%, and thus the inks were evaporated and dried. Next, a pure water was dripped, in an amount of 1 mL, onto each of the solid matters obtained after the storage to prepare evaluation samples. With respect to the evaluation samples prepared in such a manner, presence or absence of coarse particles and/or foreign matter(s) was observed by using a X200-magnification optical microscope. The re-dispersion property was evaluated in accordance with the following evaluation criterion. The results thereof are shown in TABLES 1 and 2.

AA: After dripping of the pure water, the solid matter was immediately re-dispersed (dissolved and dispersed in the pure water), and any coarse particles and/or foreign matter were not present.

A: Although some time was required for the solid matter to be re-dispersed, any coarse particles and/or foreign matter were not present.

B: Coarse particles and/or foreign matter were present.

(b) OD Value

A digital multifunction machine DCP-385C provided with an ink-jet printer produced by Brother Industries, Ltd. was used to record an image including a single-color black patch with the inks obtained in (1), at a resolution of 600 dpi×600 dpi, on a regular paper sheet, and evaluation samples were prepared. Four types of regular paper sheets were used as the regular paper sheet. "Hammermill Laser Print (trade name)" produced by International Paper Company was used as a regular paper sheet 1. "Business 4200" produced by XEROX CORPORATION was used as a regular paper sheet 2. "My Paper" produced by NBS Ricoh Co., Ltd. was used as a regular paper sheet 3. "Business" produced by XEROX CORPORATION was used as a regular paper sheet 4.

The optical density (OD value) of each of the evaluation samples was measured by using a spectrophotometric colorimetry meter Spectrolino (light source: $D_{50}$, field: 2°, status T) produced by Gretag Macbeth. The measurement of the optical density (OD value) was performed such that the measurement was performed two times for one regular paper sheet to calculate the average value thereof. Each average value is indicated as the optical density in TABLE 1 or 2. Further, each average value of the OD values of the four types of regular paper sheets is also indicated in TABLE 1 or 2.

A range within ±0.01 in the measured OD value is a range (margin) of error of the measurement apparatus. Therefore, in a case that the OD value in each of Examples 1 to 8 exceeds 0.01 with respect to the average value of the OD values of Comparative Example 1, it can be judged that the OD value was improved. In a case that the OD value in each of Examples 9 and 10 exceeds 0.01 with respect to the average value of the OD values of Comparative Example 11, it can be judged that the OD value was improved.

TABLE 1

|  | EX. 1 | EX. 2 | EX. 3 | EX. 4 |
|---|---|---|---|---|
| Pure water | balance | balance | balance | balance |
| Japanese Pharmacopoeia glycerol (85%) | 23.00 | 23.00 | 23.00 | 23.00 |
| Dipropylene glycol-n-propyl ether | 2.00 | 2.00 | 2.00 | 2.00 |
| SUNNOL NL 1430 | 0.2 (0.05) | 0.2 (0.05) | 0.2 (0.05) | 1.0 (0.25) |
| EMAL 20C | — | — | — | — |
| Mixture of sodium hexadecyl sulfate and sodium stearyl sulfate | — | — | — | — |
| OLFIN E1010 | 0.10 | 0.10 | 0.10 | 0.10 |
| Sodium 1-dodecanesulfonate | — | — | — | — |
| Sodium benzenesulfonate | — | — | — | — |
| NEOPELEX G-15 | — | — | — | — |
| Sodium laurate | — | — | — | — |
| N-hydroxysuccinimide | 0.05 | 0.10 | 0.50 | 1.00 |
| N-hydroxyphthalimide | — | — | — | — |
| Succinimide | — | — | — | — |
| Phthalimide | — | — | — | — |
| Self-dispersible pigment modified by carboxyl group | 26.66 (4.0) | 26.66 (4.0) | 26.66 (4.0) | 26.66 (4.0) |
| Self-dispersible pigment modified by phosphate group | — | — | — | — |
| (Evaluation) Absence of presence of aggregated matter | No aggregation | No aggregation | No aggregation | No aggregation |
| Storage stability of ink | AA | AA | A | A |
| OD value Regular paper 1 | 1.02 | 1.02 | 1.04 | 1.06 |

TABLE 1-continued

|  | | | | |
|---|---|---|---|---|
| OD value Regular paper 2 | 1.03 | 1.05 | 1.08 | 1.11 |
| OD value Regular paper 3 | 1.04 | 1.05 | 1.07 | 1.07 |
| OD value Regular paper 4 | 1.09 | 1.11 | 1.14 | 1.15 |
| OD value Average | 1.05 | 1.06 | 1.08 | 1.10 |

|  | EX. 5 | EX. 6 | EX. 7 | EX. 8 |
|---|---|---|---|---|
| Pure water | balance | balance | balance | balance |
| Japanese Pharmacopoeia glycerol (85%) | 23.00 | 23.00 | 23.00 | 23.00 |
| Dipropylene glycol-n-propyl ether | 2.00 | 2.00 | 2.00 | 2.00 |
| SUNNOL NL 1430 | — | — | 0.2 (0.05) | 0.2 (0.05) |
| EMAL 20C | 0.2 (0.05) | — | — | — |
| Mixture of sodium hexadecyl sulfate and sodium stearyl sulfate | — | 0.05 | — | — |
| OLFIN E1010 | 0.10 | 0.10 | — | 0.10 |
| Sodium 1-dodecanesulfonate | — | — | — | — |
| Sodium benzenesulfonate | — | — | — | — |
| NEOPELEX G-15 | — | — | — | — |
| Sodium laurate | — | — | — | — |
| N-hydroxysuccinimide | 0.10 | 0.10 | 0.10 | — |
| N-hydroxyphthalimide | — | — | — | 0.05 |
| Succinimide | — | — | — | — |
| Phthalimide | — | — | — | — |
| Self-dispersible pigment modified by carboxyl group | 26.66 (4.0) | 26.66 (4.0) | 26.66 (4.0) | 26.66 (4.0) |
| Self-dispersible pigment modified by phosphate group | — | — | — | — |
| (Evaluation) Absence of presence of aggregated matter | No aggregation | No aggregation | No aggregation | No aggregation |
| Storage stability of ink | AA | AA | AA | A |
| OD value Regular paper 1 | 1.01 | 1.02 | 1.02 | 1.05 |
| OD value Regular paper 2 | 1.05 | 1.04 | 1.06 | 1.06 |
| OD value Regular paper 3 | 1.06 | 1.05 | 1.05 | 1.05 |
| OD value Regular paper 4 | 1.11 | 1.11 | 1.12 | 1.11 |
| OD value Average | 1.06 | 1.06 | 1.06 | 1.07 |

|  | COM. EX. 1 | COM. EX. 2 | COM. EX. 3 | COM. EX. 4 |
|---|---|---|---|---|
| Pure water | balance | balance | balance | balance |
| Japanese Pharmacopoeia glycerol (85%) | 23.00 | 23.00 | 23.00 | 23.00 |
| Dipropylene glycol-n-propyl ether | 2.00 | 2.00 | 2.00 | 2.00 |
| SUNNOL NL 1430 | 0.2 (0.05) | — | 0.2 (0.05) | — |
| EMAL 20C | — | — | — | — |
| Mixture of sodium hexadecyl sulfate and sodium stearyl sulfate | — | — | — | — |
| OLFIN E1010 | 0.10 | 0.10 | 0.10 | — |
| Sodium 1-dodecanesulfonate | — | — | — | 0.05 |
| Sodium benzenesulfonate | — | — | — | — |
| NEOPELEX G-15 | — | — | — | — |
| Sodium laurate | — | — | — | — |
| N-hydroxysuccinimide | — | 0.10 | — | 0.10 |
| N-hydroxyphthalimide | — | — | — | — |
| Succinimide | — | — | 0.10 | — |
| Phthalimide | — | — | — | — |
| Self-dispersible pigment modified by carboxyl group | 26.66 (4.0) | 26.66 (4.0) | 26.66 (4.0) | 26.66 (4.0) |
| Self-dispersible pigment modified by phosphate group | — | — | — | — |

TABLE 1-continued

| (Evaluation) Absence of presence of aggregated matter | No aggregation | aggregation | No aggregation | aggregation |
|---|---|---|---|---|
| Storage stability of ink | AA | — | AA | — |
| OD value Regular paper 1 | 0.96 | — | 0.97 | — |
| OD value Regular paper 2 | 1.00 | — | 1.00 | — |
| OD value Regular paper 3 | 1.00 | — | 1.01 | — |
| OD value Regular paper 4 | 1.05 | — | 1.04 | — |
| OD value Average | 1.00 | — | 1.01 | — |

|  | COM. EX. 5 | COM. EX. 6 | COM. EX. 7 | COM. EX. 8 |
|---|---|---|---|---|
| Pure water | balance | balance | balance | balance |
| Japanese Pharmacopoeia glycerol (85%) | 23.00 | 23.00 | 23.00 | 23.00 |
| Dipropylene glycol-n-propyl ether | 2.00 | 2.00 | 2.00 | 2.00 |
| SUNNOL NL 1430 | — | — | — | — |
| EMAL 20C | — | — | — | — |
| Mixture of sodium hexadecyl sulfate and sodium stearyl sulfate | — | — | — | — |
| OLFIN E1010 | — | — | — | 0.20 |
| Sodium 1-dodecanesulfonate | — | — | — | — |
| Sodium benzenesulfonate | 0.05 | — | — | — |
| NEOPELEX G-15 | — | 0.2 (0.05) | — | — |
| Sodium laurate | — | — | 0.05 | — |
| N-hydroxysuccinimide | 0.10 | 0.10 | 0.10 | 0.10 |
| N-hydroxyphthalimide | — | — | — | — |
| Succinimide | — | — | — | — |
| Phthalimide | — | — | — | — |
| Self-dispersible pigment modified by carboxyl group | 26.66 (4.0) | 26.66 (4.0) | 26.66 (4.0) | 26.66 (4.0) |
| Self-dispersible pigment modified by phosphate group | — | — | — | — |
| (Evaluation) Absence of presence of aggregated matter | aggregation | aggregation | aggregation | aggregation |
| Storage stability of ink | — | — | — | — |
| OD value Regular paper 1 | — | — | — | — |
| OD value Regular paper 2 | — | — | — | — |
| OD value Regular paper 3 | — | — | — | — |
| OD value Regular paper 4 | — | — | — | — |
| OD value Average | — | — | — | — |

|  | COM. EX. 9 | COM. EX. 10 |
|---|---|---|
| Pure water | balance | balance |
| Japanese Pharmacopoeia glycerol (85%) | 23.00 | 23.00 |
| Dipropylene glycol-n-propyl ether | 2.00 | 2.00 |
| SUNNOL NL 1430 | — | 0.2 (0.05) |
| EMAL 20C | — | — |
| Mixture of sodium hexadecyl sulfate and sodium stearyl sulfate | — | — |
| OLFIN E1010 | 0.10 | 0.10 |
| Sodium 1-dodecanesulfonate | — | — |
| Sodium benzenesulfonate | — | — |
| NEOPELEX G-15 | — | — |
| Sodium laurate | — | — |
| N-hydroxysuccinimide | — | — |
| N-hydroxyphthalimide | 0.05 | — |
| Succinimide | — | — |
| Phthalimide | — | 0.05 |

TABLE 1-continued

| | | |
|---|---|---|
| Self-dispersible pigment modified by carboxyl group | 26.66 (4.0) | 26.66 (4.0) |
| Self-dispersible pigment modified by phosphate group | — | — |
| (Evaluation) Absence of presence of aggregated matter | aggregation | No aggregation |
| Storage stability of ink | — | A |
| OD value Regular paper 1 | — | 0.96 |
| OD value Regular paper 2 | — | 1.01 |
| OD value Regular paper 3 | — | 1.00 |
| OD value Regular paper 4 | — | 1.05 |
| OD value Average | — | 1.01 |

TABLE 2

| | EX. 9 | EX. 10 |
|---|---|---|
| Pure water | balance | balance |
| Japanese Pharmacopoeia glycerol (85%) | 23.00 | 23.00 |
| Dipropylene glycol-n-propyl ether | 2.00 | 2.00 |
| SUNNOL NL 1430 | 0.2 (0.05) | 0.2 (0.05) |
| EMAL 20C | — | — |
| Mixture of sodium hexadecyl sulfate and sodium stearyl sulfate | — | — |
| OLFIN E1010 | 0.10 | 0.10 |
| Sodium 1-dodecanesulfonate | — | — |
| Sodium benzenesulfonate | — | — |
| NEOPELEX G-15 | — | — |
| Sodium laurate | — | — |
| N-hydroxysuccinimide | 0.10 | — |
| N-hydroxyphthalimide | — | 0.05 |
| Succinimide | — | — |
| Phthalimide | — | — |
| Self-dispersible pigment modified by carboxyl group | — | — |
| Self-dispersible pigment modified by phosphate group | 26.66 (4.0) | 26.66 (4.0) |
| (Evaluation) Absence of presence of aggregated matter | No aggregation | No aggregation |
| Storage stability of ink | A | A |
| OD value Regular paper 1 | 1.21 | 1.19 |
| OD value Regular paper 2 | 1.23 | 1.19 |
| OD value Regular paper 3 | 1.17 | 1.14 |
| OD value Regular paper 4 | 1.32 | 1.32 |
| OD value Average | 1.23 | 1.21 |

| | COM. EX. 11 | COM. EX. 12 | COM. EX. 13 |
|---|---|---|---|
| Pure water | balance | balance | balance |
| Japanese Pharmacopoeia glycerol (85%) | 23.00 | 23.00 | 23.00 |
| Dipropylene glycol-n-propyl ether | 2.00 | 2.00 | 2.00 |
| SUNNOL NL 1430 | 0.2 (0.05) | — | — |
| EMAL 20C | — | — | — |
| Mixture of sodium hexadecyl sulfate and sodium stearyl sulfate | — | — | — |
| OLFIN E1010 | 0.10 | 0.10 | 0.10 |
| Sodium 1-dodecanesulfonate | — | — | — |
| Sodium benzenesulfonate | — | — | — |
| NEOPELEX G-15 | — | — | — |
| Sodium laurate | — | — | — |
| N-hydroxysuccinimide | — | 0.10 | — |
| N-hydroxyphthalimide | — | — | 0.05 |
| Succinimide | — | — | — |
| Phthalimide | — | — | — |
| Self-dispersible pigment modified by carboxyl group | — | — | — |
| Self-dispersible pigment modified by phosphate group | 26.66 (4.0) | 26.66 (4.0) | 26.66 (4.0) |
| (Evaluation) Absence of presence of aggregated matter | No aggregation | aggregation | aggregation |
| Storage stability of ink | A | — | — |
| OD value Regular paper 1 | 1.16 | — | — |
| OD value Regular paper 2 | 1.15 | — | — |
| OD value Regular paper 3 | 1.10 | — | — |
| OD value Regular paper 4 | 1.28 | — | — |
| OD value Average | 1.17 | — | — |

(3) Results and Evaluation

The inks of Examples 1 to 10 include any one of N-hydroxysuccinimide and N-hydroxyphthalimide and surfactant(s) selected from the surfactant of alkyl sulfuric acid ester salt type and the surfactant of alkyl ether sulfuric acid ester salt type. In the inks of Examples 1 to 10, the aggregated matter was not observed at the time of preparing the inks, and thus it was possible to prepare the inks. Further, in Examples 1 to 10, the storage stability of each ink was superior ("A" or "AA") and the OD value of each ink was not less than 1.06. It was possible to confirm the effect to improve the OD value in each of the Examples 1 to 8 in which the self-dispersible pigment modified by the carboxyl group was used, as compared with Comparative Example 1. Further, it was possible to confirm the effect to improve the OD value in each of the Examples 9 and 10 in which the self-dispersible pigment modified by the phosphate group was used, as compared with Comparative Example 11.

In Examples 1 to 10, the compositions, which were stored for duration of one day under the environment of temperature: 60° C. and relative humidity: 40%, had the superior stability. The reason thereof is considered as follows. Almost all of the water of solvent components in each composition is lost under the above stability condition. However, a low-volatility component (such as glycerol) other than the water is remained. Thus, the pigment particles are contained in the low-volatility component in a state of being dispersed stably.

In Examples 3 and 4 in which the content of N-hydroxy cyclic imide compound in the ink was high not less than 0.50% by mass, the improvement of the OD value was high in particular. From this result, it is assumed that when the content of the N-hydroxy cyclic imide compound is increased, the OD value becomes higher. Further, it is appreciated that the high OD value is obtained when the content of N-hydroxy cyclic imide compound in the ink is not less than 0.50% by mass.

The composition of Example 3 had the OD value higher than that of the composition of Example 2 (having the same blending amount as Example 3 other than the N-hydroxy cyclic imide compound). However, as compared with Example 2, the storage stability of the ink was low. Further, although the amount of the N-hydroxysuccinimide in the composition of Example 4 was twice as much as that in the composition of Example 3, the storage stability of the ink was equivalent to that of Example 3. The amount of the surfactant of sulfuric acid ester salt type in the composition of Example 4 was five times as much as that in the composition of Example 3. From these results, the following fact has been revealed. That is, not only the N-hydroxy cyclic imide compound but also the surfactant of sulfuric acid ester salt type is required to be increased in weight, in order to obtain the composition having superior storage stability of the ink. In Examples 1 to 10, the mass ratio (X:Y) between the N-hydroxy cyclic imide compound (X) and the surfactant of sulfuric acid ester salt type (Y) was 1:0.1 to 1:1. It is appreciated that, by making the mass ratio within the above-described range, the optical density of the image can be improved without interfering with the storage stability of the ink.

Further, the following fact has been confirmed. That is, the modification group of the self-dispersible pigment may be the carboxyl group or the phosphate group to obtain the above effect obtained by containing the N-hydroxy cyclic imide compound and the surfactant of sulfuric acid ester salt type. Although no detailed data is shown, the effect, which is the same as or equivalent to that obtained in the self-dispersible pigment having the modification group of the carboxyl group or the phosphate group, was also obtained when the modification group is the sulfo group, the salt of the carboxyl group, the salt of the phosphate group, or the salt of the sulfo group.

On the other hand, in the ink mixtures (Comparative Examples 2, 4 to 9, 12, and 13), which include any one of N-hydroxysuccinimide and N-hydroxyphthalimide but do not include the surfactant of sulfuric acid ester salt type, the aggregation was observed, and thus it is not possible to prepare the inks. Each of the ink mixtures includes a surfactant different from the surfactant of sulfuric acid ester salt type. From this result, it is assumed as follows. That is, the surfactant selected from the surfactant of alkyl sulfuric acid ester salt type and the surfactant of alkyl ether sulfuric acid ester salt type contributes to the suppression of the aggregation of the pigment particles.

Further, in the inks (Comparative Examples 1, 3, 10, and 11), which include the surfactant of alkyl sulfuric acid ester salt type and the surfactant of alkyl ether sulfuric acid ester salt type but do not include the water-soluble N-hydroxy cyclic imide compound, it was possible to prepare the inks and the storage stability of each ink was superior ("A" or "AA"). However, the effect to improve the OD value was not obtained. Each of the compositions in Comparative Examples 3 and 10 includes a cyclic imide compound in which hydrogen at N-position is not substituted by the hydroxy group. However, the effect to improve the OD value was not obtained. From this result, it is assumed that the effect to improve the OD value can not obtained in the composition which does not contain the N-hydroxy cyclic imide compound and that the hydroxy group at N-position contributes to the improvement of the OD value.

What is claimed is:

1. An ink for ink-jet recording comprising:
   water;
   a water-soluble organic solvent;
   a water-soluble N-hydroxy cyclic imide compound;
   a self-dispersible pigment; and
   a surfactant of sulfuric acid ester salt type.

2. The ink for ink-jet recording according to claim 1, wherein the N-hydroxy cyclic imide compound is N-hydroxysuccinimide or N-hydroxyphthalimide.

3. The ink for ink-jet recording according to claim 1, wherein the self-dispersible pigment is modified by at least one functional group selected from the group consisting of carboxyl group, phosphate group, and salt thereof.

4. The ink for ink-jet recording according to claim 1, wherein the surfactant of sulfuric acid ester salt type is a surfactant of alkyl sulfuric acid ester salt type or a surfactant of alkyl ether sulfuric acid ester salt type represented by a general formula (1);

$$R^1O-(R^2O)_n-SO_3M \tag{1}$$

in the general formula (1), $R^1$ is an alkyl group, $R^2$ is an ethylene group or a propylene group, n is 0 to 10, M is an alkali metal, an alkali earth metal, ammonium, or alkanolamine.

5. The ink for ink-jet recording according to claim 1, wherein the surfactant of sulfuric acid ester salt type is a surfactant of alkyl ether sulfuric acid ester salt type including a polyoxyethylene structure.

6. The ink for ink-jet recording according to claim 1, wherein the N-hydroxy cyclic imide compound is contained in an amount ranging from 0.01% by mass to 2% by mass.

7. The ink for ink-jet recording according to claim 6, wherein the N-hydroxy cyclic imide compound is contained in an amount ranging from 0.05% by mass to 1.0% by mass.

8. The ink for ink-jet recording according to claim 1, wherein the N-hydroxy cyclic imide compound is contained in an amount of not less than 0.50% by mass.

9. The ink for ink-jet recording according to claim 1, wherein a mass ratio (X:Y) of the N-hydroxy cyclic imide compound (X) to the surfactant of sulfuric acid ester salt type (Y) is 1:0.1 to 1:1.

10. An ink-jet recording method which performs recording on a recording medium comprising:
    preparing the ink for ink-jet recording as defined in claim 1; and
    discharging the ink onto the recording medium.

11. An ink-jet recording apparatus which performs recording on a recording medium, comprising:
    an ink accommodating section in which the ink for ink-jet recording as defined in claim 1 is accommodated; and
    an ink discharge mechanism which discharges the ink onto the recording medium.

* * * * *